(12) United States Patent
Akashe et al.

(10) Patent No.: US 7,108,881 B2
(45) Date of Patent: *Sep. 19, 2006

(54) METHOD OF PREPARATION OF HIGH QUALITY SOY CULTURED PRODUCTS

(75) Inventors: Ahmad Akashe, Mundelein, IL (US); Katie Das, Gurnee, IL (US); Meredith Lane, Naperville, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/696,284

(22) Filed: Oct. 29, 2003

(65) Prior Publication Data

US 2004/0170744 A1 Sep. 2, 2004

Related U.S. Application Data

(63) Continuation-in-part of application No. 09/939,500, filed on Aug. 23, 2001, now Pat. No. 6,787,173.

(51) Int. Cl.
A23L 1/20 (2006.01)

(52) U.S. Cl. .............. 426/422; 426/634; 426/46; 426/656; 426/495

(58) Field of Classification Search ............ 426/634, 426/656, 422, 495, 34, 46
See application file for complete search history.

(56) References Cited

U.S. PATENT DOCUMENTS

| | | | |
|---|---|---|---|
| 3,852,491 A | 12/1974 | Malzahn | |
| 3,995,071 A | 11/1976 | Goodnight, Jr. et al. | |
| 4,072,670 A | 2/1978 | Goodnight, Jr. et al. | |
| 4,088,795 A | 5/1978 | Goodnight, Jr. et al. | |
| 4,091,120 A | 5/1978 | Goodnight, Jr. et al. | |
| 4,100,024 A | 7/1978 | Adler-Nissen | |
| 4,105,803 A | 8/1978 | Peng | |
| 4,172,828 A | 10/1979 | Davidson et al. | |
| 4,205,090 A | 5/1980 | Maubois et al. | |
| 4,211,694 A | 7/1980 | Youngquist | |
| 4,420,425 A | 12/1983 | Lawhon | |
| 4,432,999 A | 2/1984 | Bily | |
| 4,477,480 A | 10/1984 | Seidel et al. | |
| 4,478,854 A | 10/1984 | Adler-Nissen et al. | |
| 4,497,836 A | 2/1985 | Marquardt et al. | |
| 4,530,788 A | 7/1985 | Chang | |
| 4,623,550 A | 11/1986 | Willard | |
| 4,632,903 A | 12/1986 | Boyce et al. | |
| RE32,725 E | 8/1988 | Howard et al. | |
| 4,761,186 A | 8/1988 | Schara et al. | |
| 4,770,891 A | 9/1988 | Willard | |
| 4,908,224 A | 3/1990 | Yoder | |
| 5,077,062 A | 12/1991 | Ernster | |
| 5,100,679 A | 3/1992 | Delrue | |
| 5,160,758 A | 11/1992 | Parks et al. | |
| 5,433,969 A | 7/1995 | McMindes et al. | |
| 5,626,899 A | 5/1997 | Payne et al. | |
| 5,658,714 A | 8/1997 | Westfall et al. | |
| 5,725,899 A * | 3/1998 | Cole et al. ................. | 426/598 |
| 5,780,439 A | 7/1998 | Mendy et al. | |

(Continued)

FOREIGN PATENT DOCUMENTS

EP 1210879 A 6/2002

(Continued)

*Primary Examiner*—Anthony Weier

(57) ABSTRACT

Soy-containing fermented products, especially soy-containing yogurts, beverage, as well as methods for producing such products, are provided. The soy-containing fermented products are prepared using deflavored soy protein material, preferably deflavored soy milk.

10 Claims, 11 Drawing Sheets

U.S. PATENT DOCUMENTS

| | | |
|---|---|---|
| 5,858,442 A | 1/1999 | Payne et al. |
| 5,936,069 A | 8/1999 | Johnson |
| 6,022,702 A | 2/2000 | Tsumura et al. |
| 6,068,865 A | 5/2000 | Lee et al. |
| 6,126,973 A | 10/2000 | Tsumura et al. |
| 6,136,351 A | 10/2000 | Nauth et al. |
| 6,139,901 A | 10/2000 | Blazey et al. |
| 6,221,423 B1 | 4/2001 | Cho et al. |
| 6,291,009 B1 | 9/2001 | Cohen |
| 6,383,531 B1 | 5/2002 | Gottemoller et al. |
| 6,399,135 B1 | 6/2002 | Gottemoller et al. |
| 6,413,569 B1 | 7/2002 | Borders et al. |
| 6,432,457 B1 | 8/2002 | Jones |
| 6,479,089 B1 | 11/2002 | Cohen |
| 6,495,187 B1 | 12/2002 | Borders et al. |
| 6,528,622 B1 | 3/2003 | Ayers et al. |
| 6,537,597 B1 | 3/2003 | Nakamori et al. |
| 6,582,746 B1 | 6/2003 | Altemueller et al. |
| 6,630,195 B1 | 10/2003 | Muralidhara et al. |
| 6,726,943 B1 | 4/2004 | Prosise et al. |
| 6,787,173 B1 * | 9/2004 | Akashe et al. .......... 426/422 |
| 6,841,184 B1 | 1/2005 | Porter et al. |
| 2001/0055642 A1 | 12/2001 | Cohen |
| 2002/0098276 A1 | 7/2002 | Porter et al. |
| 2002/0102339 A1 | 8/2002 | Akashe et al. |
| 2002/0102346 A1 | 8/2002 | Stark et al. |
| 2002/0106437 A1 | 8/2002 | Karleskind et al. |
| 2002/0106440 A1 | 8/2002 | Porter et al. |
| 2002/0114877 A1 | 8/2002 | Stark et al. |
| 2004/0161512 A1 | 8/2004 | Akashe et al. |
| 2004/0161525 A1 | 8/2004 | Akashe et al. |
| 2004/0170743 A1 | 9/2004 | Akashe et al. |
| 2004/0171744 A1 | 9/2004 | Das et al. |
| 2004/0175474 A1 | 9/2004 | Akashe et al. |
| 2004/0175479 A1 | 9/2004 | Akashe et al. |
| 2004/0253355 A1 | 12/2004 | Akashe et al. |

FOREIGN PATENT DOCUMENTS

| | | |
|---|---|---|
| GB | 1580051 | 11/1980 |
| JP | 8066161 A | 3/1996 |
| WO | WO 97/43906 | 11/1997 |
| WO | WO 00/16642 A | 3/2000 |
| WO | WO 02/100186 | 12/2002 |
| WO | WO 03/070007 A2 | 8/2003 |

* cited by examiner

METHOD OF PREPARATION OF HIGH QUALITY SOY CULTURED PRODUCTS

The present application is a continuation-in-part application of U.S. patent application Ser. No. 09/939,500, filed Aug. 23, 2001, now U.S. Pat. No. 6,787,173, which was based on, a claimed benefit of, U.S. Provisional Application Ser. No. 60/250,228, filed on Nov. 30, 2000, both of which are hereby incorporated by reference.

BACKGROUND OF THE INVENTION

This invention relates generally to the processing of soy-derived materials for use in various food products, especially cultured soy products. More particularly, the invention relates to a method of deflavoring soy materials in order to make them acceptable in a wide range of foods, including cultured soy products.

In recent years, soy proteins have become widely used in food products, for the health benefits to be obtained from their use. In some applications, the taste of the soy materials is not objectionable. However, in some uses, such as dairy analog products, beverages and the like, the flavors found in soy materials may prevent their ready acceptance by the consumer. Thus, in order to extend the uses of soy materials, the present inventors wanted to find a method of reducing the flavor components of soy materials. However, it was not evident that methods which had been used previously to remove flavor components from other organic materials would be successful in the treating of soy materials. Organic materials, since they have complex compositions, must be tested to determine whether any given method of treating them will be satisfactory.

One example of previously employed methods to purify organic materials is found in U.S. Pat. No. 4,477,480, in which the patentees show that starch can be treated with an alkali to remove objectionable flavor components. In a commonly assigned patent, U.S. Pat. No. 4,761,186, ultrafiltration is used to purify starch. In both cases, flavor components are removed from the starch, in the '480 patent by solubilizing the flavor components so that they can be washed out of the relatively insoluble starch. In the '186 patent, ultrafiltration was used to remove the flavor components as permeate, while the insoluble starch remained in an aqueous slurry. By contrast, the present invention separates flavor components from soluble high molecular weight soy proteins.

There are many articles and patents which relate to processing soy materials in order to recover the protein content and which at the same time reduce the flavor compounds to make the proteins more acceptable in food products. However, these previous disclosures were not specifically directed to removal of flavoring compounds and recovering as much of the protein as possible. One example is U.S. Pat. No. 4,420,425 in which protein components of soy are solubilized at a pH of 7 to 11, preferably about 8 and, after ultrafiltration through a membrane having a molecular weight cut off above 70,000, are recovered by spray drying the retained soy proteins. In variants, only a portion of the protein is solubilized at lower pH values and subjected to ultrafiltration with a membrane having a cutoff preferably above 100,000 molecular weight, the product was found to have improved color and flavor. A higher cutoff valve would be expected to result in a loss of valuable proteins. In another patent, U.S. Pat. No. 5,658,714, a soy flour slurry is pH-adjusted to the range of 7 to 10 to solubilize proteins, which are then passed through an ultrafiltration membrane and phytate and aluminum are retained, presumably as solids. While the molecular weight cutoff of the membrane was not given, it is assumed that the pore size was large in order to be able to pass the soluble proteins. Both of these patents contain extensive discussions of the efforts of others in the processing of soy materials; neither teaches or suggests the control of pH during the ultrafiltration process.

In a group of related patents, Mead Johnson Company disclosed processes for solubilizing soy proteins by raising the pH of an aqueous solution of soy materials and recovering the proteins which are said to have a bland taste. The processes are principally directed to concentrating proteins rather than removing flavor compounds. In U.S. Pat. No. 3,995,071, the pH was increased to 10.1 to 14 (preferably 11 to 12) to solubilize soy proteins, after which the pH was lowered to about 6 to 10 and ultrafiltration with a membrane having a molecular weight cutoff of 10,000 to 50,000 Daltons was used to retain the proteins while discarding carbohydrates and minerals. In U.S. Pat. No. 4,072,670, emphasis was placed on removing phytates and phytic acid by solubilizing proteins at a pH of 10.6 to 14 and a temperature of 10 to 50° C. to make the phytates and phytic acid insoluble, then separating them and finally acidifying the solution to a pH of about 4 to 5 to precipitate the soy proteins. In U.S. Pat. No. 4,091,120 soy proteins were solubilized at a pH less than 10, preferably 7 to 9 and ultrafiltration was used to separate the proteins as retentate, while passing carbohydrates as permeate. These patent do not teach or suggest control of the pH during the ultrafiltration process.

The present inventors wanted to remove compounds in soy materials which contribute color and flavor and which interfere with the use of soy in certain food products such as beverages, dairy analogs, and the like. They have found that soy-derived materials can be treated successfully using the process to be described below, recovering substantially all of the proteins and rejecting the compounds which cause undesirable color and flavor. Moreover, by controlling the pH within the range of about 9 to about 12 during the ultrafiltration process, deflavored soy materials having improved functional properties can be obtained. Thus, the product is suitable for many food products.

SUMMARY OF THE INVENTION

The present invention provides soy-containing fermented or cultured products, especially yogurt, prepared using deflavored soy protein. Broadly, the deflavored soy protein is prepared using a process wherein an aqueous soy composition is prepared having a soy concentration of about 1 to about 20 percent, which composition is then pH-adjusted to solubilize the protein content and to release the flavoring compounds. Then the composition is subjected to ultrafiltration, while maintaining pH control, using a membrane capable of retaining substantially all of the protein content of the soy while removing flavoring components as permeate.

The deflavored soy materials prepared by the present methods are ideally suited for use in dairy and non-dairy beverages, smoothies, health drinks, confectionary type products, nutritional bars, cheeses, cheese analogs, dairy and non-dairy yogurts, meat and meat analog products, cereals, baked products, snacks, and the like. Especially preferred yogurts are prepared using deflavored soy milk or flavored soy milk (e.g., chocolate soy milk, vanilla soy milk, and the like) using deflavored soy milk. Such preferred yogurts are generally prepared by fermented the deflavored soymilk prepared by the methods described herein. Deflavored soy-containing yogurts containing essentially all soy protein or mixtures of soy protein and milk protein can be prepared using the present invention.

In one embodiment, the present invention provides a soy-containing fermented product comprising fermented soy milk prepared by fermenting deflavored soy milk, wherein the deflavored soy milk is prepared by a method comprising:

(a) obtaining a soy milk composition containing soluble soy proteins, flavoring compounds, and insoluble materials;

(b) solubilizing the soy proteins by adjusting the soy milk composition of (a) to a pH in the range of about 9 to about 12 and releasing the flavoring compounds;

(c) passing the pH-adjusted soy milk composition of (b) adjacent an ultrafiltration membrane having a molecular weight cutoff up to about 50,000 Daltons, while maintaining the pH in the range of about 9 to about 12, under suitable ultrafiltration conditions wherein the flavor compounds pass through the membrane, thereby deflavoring the soy milk composition and retaining substantially all of the solubilized soy proteins; and (d) recovering the solubilized soy proteins retained by the ultrafiltration membrane, wherein the recovered solubilized soy proteins is the deflavored soy milk. Preferably the soy-containing fermented product is soy-containing yogurt.

In another embodiment, the present invention provides a method of preparing a soy-containing fermented product, said method comprising (1) preparing a mixture of deflavored soy milk material and an effective amount of a dairy culture; and (2) fermenting the mixture to form the soy-containing fermented product;

wherein the deflavored soy milk material is prepared by a method comprising:

(a) obtaining a soy milk composition containing soluble soy proteins, flavoring compounds, and insoluble materials;

(b) solubilizing the soy proteins by adjusting the soy milk composition of (a) to a pH in the range of about 9 to about 12 and releasing the flavoring compounds;

(c) passing the pH-adjusted soy milk composition of (b) adjacent an ultrafiltration membrane having a molecular weight cutoff up to about 50,000 Daltons, while maintaining the pH in the range of about 9 to about 12, under suitable ultrafiltration conditions wherein the flavor compounds pass through the membrane, thereby deflavoring the soy milk composition and retaining substantially all of the solubilized soy proteins; and (d) recovering the solubilized soy proteins retained by the ultrafiltration membrane, wherein the recovered solubilized soy proteins is the deflavored soy milk material. Preferably the soy-containing fermented product is soy-containing yogurt.

In one aspect, the invention is a method of deflavoring soy-derived materials such as soy milk, soy flour, soy concentrates, and soy protein isolates, which method includes preparing an aqueous composition of the soy material containing flavoring compounds, adjusting the pH to the range of about 9 to 12 to solubilize the protein content of the soy material and release the flavor components, and then passing the pH-adjusted composition adjacent to an ultrafiltration membrane having pores which provide a molecular weight cutoff up to 50,000 Daltons while maintaining the pH in the range of about 9 to about 12, thus retaining substantially all of the protein content, while passing through the pores the flavor producing compounds.

In another aspect, the invention includes adjusting the pH to the range of about 9 to 12 with an alkali such as sodium, potassium or calcium hydroxides to solubilize the protein content and releasing the flavor compounds, making it possible to separate such compounds by ultrafiltration. Importantly, the pH is also controlled within the range of about 9 to about 12 during the ultrafiltration process.

In one embodiment, the invention is a method for deflavoring soy materials in a continuous process wherein a pH-adjusted aqueous mixture of soy materials is passed adjacent an ultrafiltration membrane to separate the flavor components. The pH is maintained at about 9 to about 12 during the ultrafiltration by the addition of the appropriate amount of an appropriate pH-altering material (generally a base). The permeate containing flavor components and water is passed adjacent a reverse osmosis membrane to dewater the permeate and the separated water is recycled to join recycled retentate and fresh pH-adjusted soy materials. A portion of the retentate is continually removed and the deflavored soy materials recovered.

In a preferred embodiment, the invention is a method for deflavoring soy materials in a batch or semi-continuous process wherein a pH-adjusted aqueous mixture of soy materials is passed adjacent an ultrafiltration membrane, the permeate is separated for recovery of the flavor components, and the retentate is recycled to join fresh pH-adjusted soy materials. Water is added periodically or continuously to replace the water lost to the permeate and to adjust the concentration of soy materials in the combined stream to a predetermined level. If necessary, a pH-altering material (e.g., a base) can be added to the recycled retentate or added water to control the pH to the desired range during the ultrafiltration process. The process is continued until all of the flavoring compounds have been removed.

In another preferred embodiment, the present invention provides a method for preparing deflavored soy protein material, said method comprising:

(a) preparing an aqueous composition of a soy material containing soluble soy proteins, flavoring compounds, and insoluble materials;

(b) solubilizing the soy proteins by adjusting the aqueous composition of (a) to a pH in the range of about 9 to about 12 and releasing the flavoring compounds;

(c) removing the insoluble materials from the pH-adjusted aqueous composition of (b) to obtain a treated aqueous composition;

(d) passing the treated aqueous composition of (c) adjacent an ultrafiltration membrane having a molecular weight cutoff up to about 50,000 Daltons, while maintaining the pH in the range of about 9 to about 12, under suitable ultrafiltration conditions wherein the flavor compounds pass through the membrane, thereby deflavoring the soy material and retaining substantially all of the solubilized soy proteins; and (e) recovering the solubilized soy proteins retained by the ultrafiltration membrane to obtain the deflavored soy protein material.

The ultrafiltration membrane used in the method of the invention will have a molecular weight cutoff up to 50,000 Daltons, preferably 1,000 to 50,000, most preferably about 10,000 and preferably is a polyethersulfone or ceramic membrane.

DESCRIPTION OF THE PREFERRED EMBODIMENTS

Figure 1:
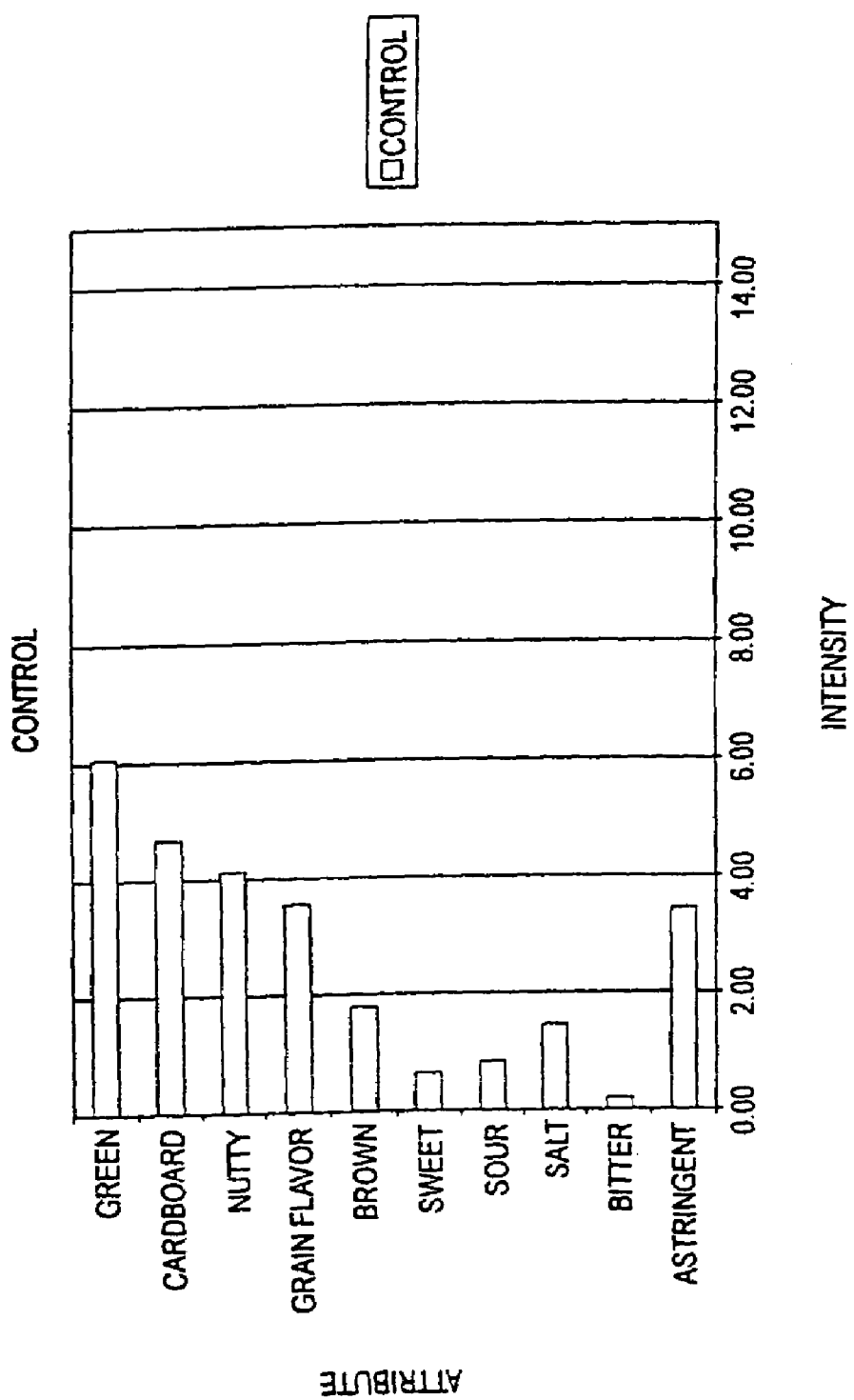
FIG. 1 is a graph of the intensity of soy flavor attributes.

Soy-Derived Materials. Soybeans are valuable sources of oil and, in the present invention, of proteins. Soy beans contain about 40 percent proteins, which have been classified after ultracentrifugation as 2S, 7S, 11S and 15S (see also U.S. Pat. No. 4,420,425). These fractions may contain other materials as well and they have a wide molecular-weight range, from 3,000 to 600,000. It is well known that soy products have undesirable odors and flavors which should be removed in order to make the soy materials widely useful in food products. It is believed that lipoxygenases catalyze the oxidation of certain polyunsaturated fatty acids, producing hydroperoxides which are degraded into volatile carbonyl compounds, associated with objectionable odors and flavors in soy-derived materials. Some of the compounds associated with soy flavors are described in Table C in Example 10 below.

While the protein content of soy-derived materials is considered a valuable fraction for use in food products, soluble carbohydrates are considered undesirable. Their removal from soy protein fractions is an objective in many processes in which the proteins are recovered.

Phytates are compounds which also are considered undesirable in soy proteins. These compounds are calcium-magnesium-potassium salts of inositol hexaphosphoric acid. Such compounds are believed to chelate metal ions and are not readily absorbed by the human body. They are considered to bind to soy proteins and interfere with digestion. As mentioned above, removal of phytates has been an objective of workers in the field of soy-derived materials.

Ultrafiltration Membranes. Filtration is used to separate many materials. In the present invention, ultrafiltration is used to remove flavoring compounds from soy-derived materials. Importantly, the pH of the soy-derived material should be maintained in the range of about 9 to about 12 during the ultrafiltration process. Ultrafiltration is intended to remove particles having a size between 10 to 1,000 Angstroms (0.001 to 0.1 µm), corresponding generally to particles having a molecular weight between 10,000 and 1,000,000, and which may also be affected by the shape of such high molecular weight particles. Soy proteins have molecular range between about 3,000 and 600,000. A membrane may be chosen which is capable of passing all of the soy proteins or only a selected portion. In the present invention, the soy proteins are retained by the ultra filtration membrane under the selected operating conditions, while the lower molecular weight flavoring compounds pass through the membrane and are separated, thus improving the color and flavor of the retained soy proteins and associated solids.

A polymer ultrafiltration membrane may be defined as an anisotropic (non-uniform) layer. One face is a skin containing pores which determine the size of molecules which can pass through the membrane. Supporting the surface skin is a spongy structure which extends to the opposite face. Such membranes are commonly made by coagulation of polymers in an aqueous bath. Typical polymers which are used include polysulfones, cellulose esters, poly(vinyldenefluoride), poly (dimethylphenylene oxide), poly (acrylonitrile), which can be cast into membranes. Often, the membranes are formed into hollow tubes which are assembled into bundles, through which the solution to be filtered is passed. Alternatively, flat membrane sheets and spiral designs may be used. In commercial practice, pressure is applied to facilitate movement of the lower molecular weight compounds through the membrane. The membrane must be able to withstand the pressures used, making it important that the spongy supporting structure be uniform to avoid breaking the surface skin and bypassing the membrane.

In addition to the polymeric membranes just described, other materials have been used to make ultrafiltration membranes, such as ceramics, sintered metals, and other inorganic materials. The present invention is not limited to any particular type of membrane. The present invention is not limited to any particular type of membrane. In general, the membrane must be able to pass the flavoring compounds, which are believed to have molecular weights lower than 1,000 Dalton. More importantly, the membranes must be able to retain substantially all of the solubilized soy proteins. Thus, the membrane of the invention will have a molecular weight cutoff up to about 50,000 Daltons, preferably about 1,000 to 50,000, more preferably 10,000 to 30,000.

Process. The process of the invention includes the following steps:

(1) Prepare an aqueous mixture of the soy-derived material;

(2) Add a base to raise the pH of the aqueous mixture to about 9 to about 12 in order to solubilize the soy proteins and to release the flavoring compounds;

(3) Pass the pH-adjusted mixture, while maintaining the pH in the range of about 9 to about 12, adjacent to an ultrafiltration membrane having a molecular weight cutoff up to about 50,000, remove the flavoring compounds as permeate, and remove the remaining soy proteins and other soy materials as retentate; and (4) Neutralize the retentate and recover the soy proteins.

All types of soy materials are considered to be potential sources of soy for use in food products. Thus, soy materials which contain proteins are combined into an aqueous mixture, generally a slurry of soy solids. The protein content is needed for food products, but as discussed above, it is believed to contain flavoring compounds which must be released in order that they can be separated. The separation of flavoring compounds is carried out in an aqueous mixture in which both the proteins and flavoring compounds are dissolved. The concentration of the soy materials in the aqueous mixture will be in the range of about 1 to about 20 percent. Generally, the concentration of soy materials after pH adjustment will change during the subsequent ultrafiltration step as water is removed with the permeate. The water will be replaced either periodically or continuously.

For example, in diafiltration water is added to gradually dilute the retained proteins in a batch or semi-continuous process.

The second step, as will be seen in the examples, is important if removal of the flavoring compounds is to be accomplished. The soy proteins are solubilized by adding a base to the aqueous mixture to achieve a pH of about 9 to 12. In general, it has been found that a pH of 9 is needed to solubilize all of the proteins, while a pH higher than 12 is likely to cause undesirable degradation of the proteins. While in theory, any base might be used, sodium or potassium hydroxide are preferred, particularly potassium hydroxide. Other bases which may have application include calcium, magnesium and ammonium hydroxides. It is believed that solubilizing the soy proteins changes their shape and in some manner results in releasing the flavoring compounds, which may be bound or encapsulated by the soy proteins when they are in a neutral or acid solution. The flavoring compounds, which have relatively low molecular weight compared to the soy proteins are able to pass through the pores of the ultrafiltration membrane, while substantially all of the solubilized soy proteins are too large and are retained. Importantly, the pH should be maintained within the just described range (i.e., about 9 to about 12) during the ultrafiltration/diafiltration process to allow as much of the flavoring compounds as possible to be removed.

The third step could be carried out in a batch manner similar to the laboratory experiments reported below in Examples 1–5 in which the flavor compounds and water passed through the membrane and were removed by flowing water. However, in commercial applications of the process of the invention, the pH-adjusted aqueous mixture would be circulated continuously adjacent to an ultrafiltration membrane. Since water, the caustic and the flavoring compounds pass through the membrane as permeate and are discarded, additional water will be added to maintain the desired concentration of soy materials, which will tend to lower the pH of the aqueous mixture. This water may be augmented by dewatering the permeate and recycling the recovered water to the feed stream. A pH-modifying material (e.g., base) can be added as necessary to control the pH in the desired range (i.e., about 9 to about 12) directly to the ultrafiltration solution, to any recycled aqueous material, or to makeup water as desired.

After removal of the flavoring compounds (i.e., after completion of the ultrafiltration process), further neutralization of the filtered solution may be accomplished by withdrawing product and adding an acid as required to reach the desired pH. After pH adjustment, the aqueous mixture of soy proteins and other materials may be used directly in food products, or it may be concentrated or dried as required for the intended use.

Figure 8:
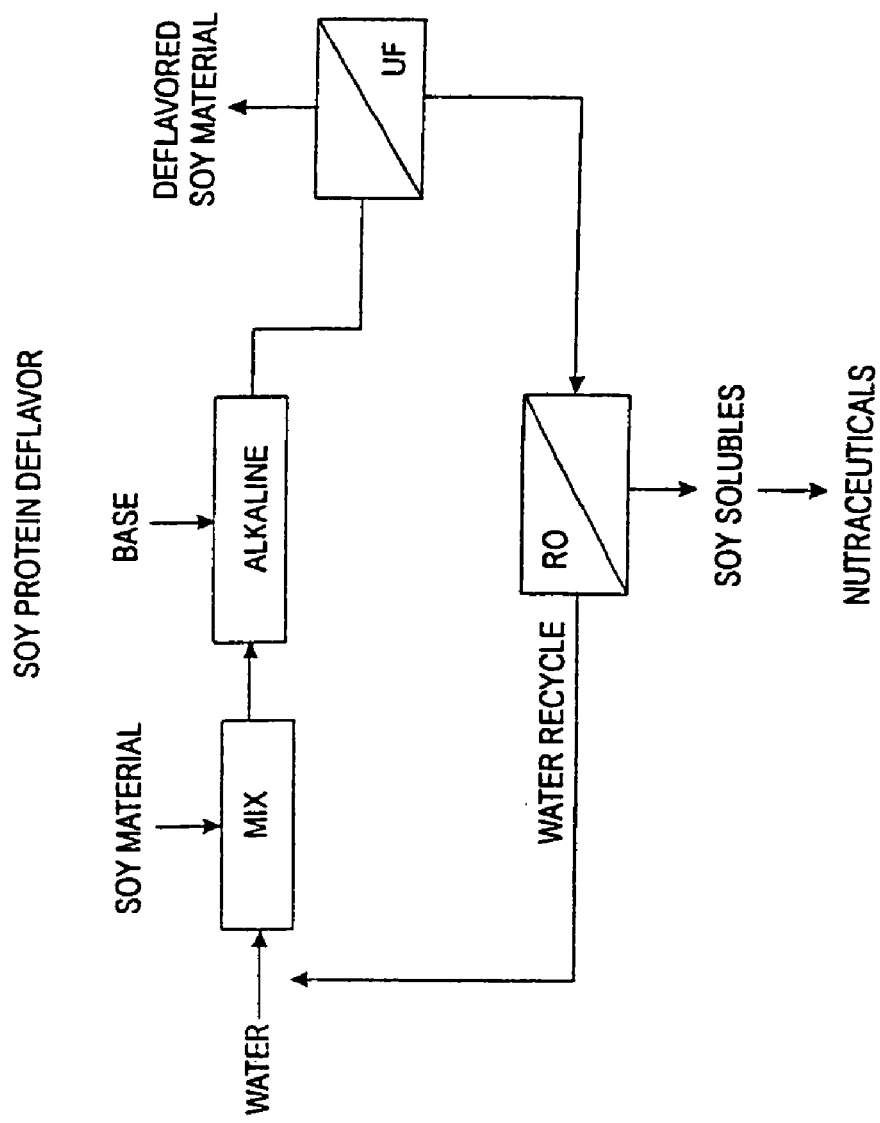
FIG. 8 is a block diagram of one process employing the invention.
Figure 9:
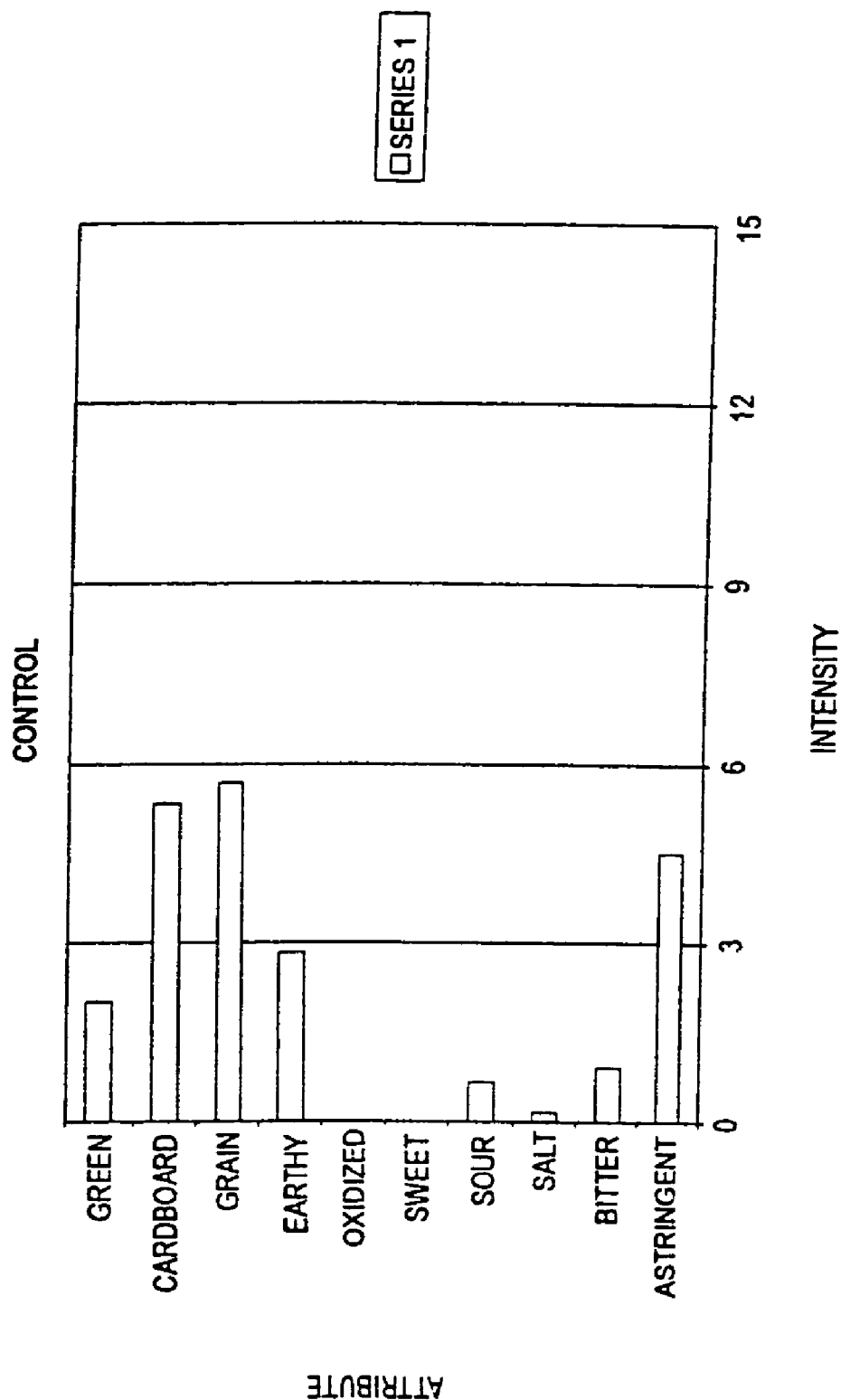
FIG. 9 is a graph of the intensity of soy isolate flavor attributes.
Figure 10:
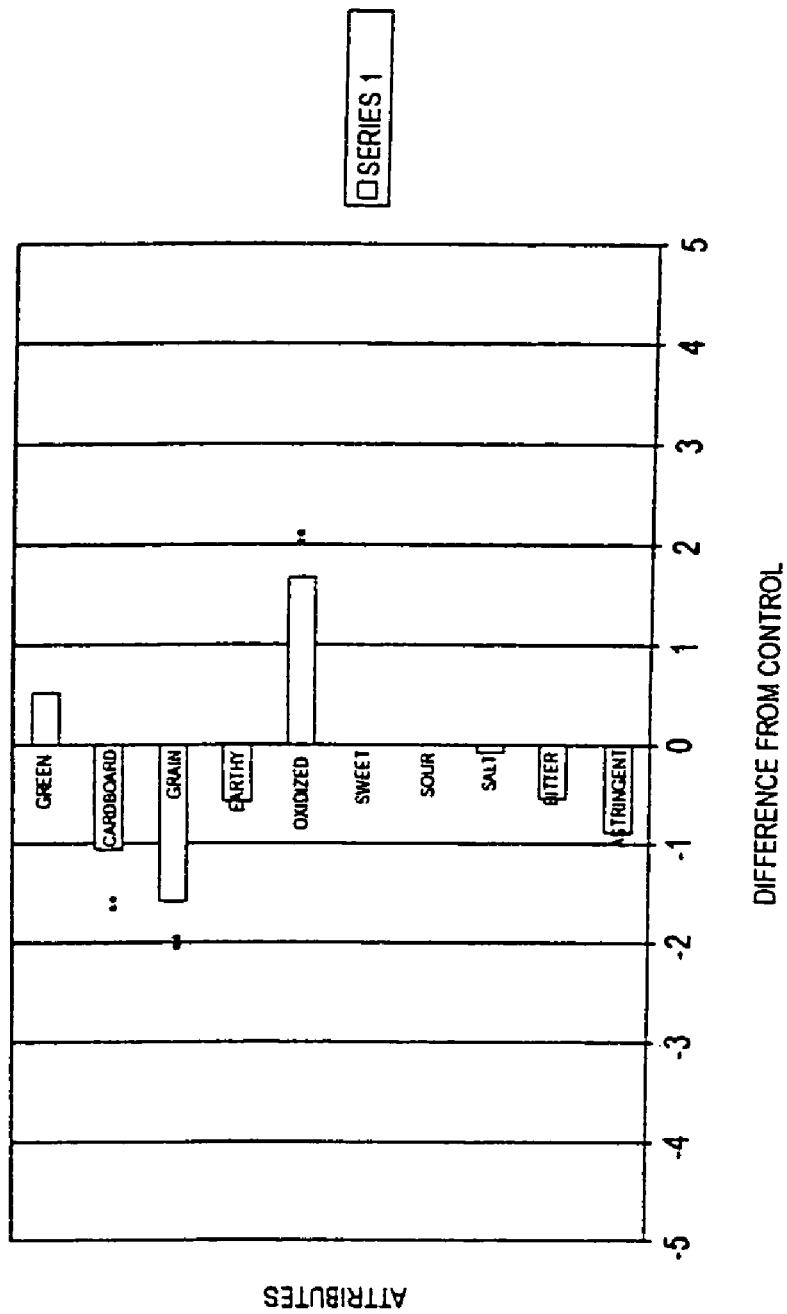
FIG. 10 is a graph of the intensity of deflavored soy isolate compared to a control sample.

A process for deflavoring soy materials by ultrafiltration may be operated in various ways. The pH during the ultrafiltration/diafiltration process is maintained in the range of about 9 to about 12, and preferably in the range of about 9.5 to about 10.5. Two methods will be described, continuous processing and batch (including semi-continuous operation) processing. It is expected that commercial processes will adopt batch or semi-continuous operation, which should be better suited to production of food-grade soy products. A continuous process is generally shown in FIG. 8. In either a continuous or batch process an aqueous mixture of soy materials is pH adjusted to solubilize soy proteins and release flavor compounds and then passed adjacent an ultrafiltration membrane which permits the lower molecular weight flavoring materials to pass through its pores along with water (the permeate), leaving the higher molecular weight soy materials (the retentate) to be recirculated. A portion of the retentate will be withdrawn as deflavored product, from which the soy materials can be recovered as needed for the ultimate end use. Water will be added to replace that lost in the permeate and to provide a constant concentration of soy materials in the feed stream supplied to the ultrafiltration membrane. Although not essential to the process, the process of FIG. 8 includes additional processing of the permeate to recover a portion of the water using a reverse osmosis membrane for recycling to join the retentate and fresh soy materials. The advantage of such a step is in reducing the amount of fresh water which must be added to the process and removed in concentrating the permeate. Of course, the pH of the soy-derived materials can be kept within the desired range by appropriate addition of a base to the recycled or fresh water added to the process or by direct addition of base as desired.

In a batch process, such as those described in Examples 6–8 below, a batch of soy material is placed in a vessel, pH adjusted, and fed to an ultrafiltration membrane. The permeate is separated and the retentate is returned to the vessel. As the process proceeds, the soy material is depleted in the lower molecular weight flavoring compounds and water and becomes more concentrated in the desirable soy proteins. Periodically, water is added to the retentate to dilute it and provide a carrier for the flavoring compounds which are passed through the membrane. In a semi-continuous process the water is added continuously at the rate it is being removed in the permeate. The process is continued until all of the flavoring compounds have been removed and the retentate is sufficiently deflavored to become the product, which can be further processed as required for the ultimate end use. A batch or semi-continuous process may also include the concentration of the permeate, with recycle of separated water in a similar manner as that shown in FIG. 8. The pH during the ultrafiltration/diafiltration process is maintained in the range of about 9 to about 12, and preferably in the range of about 9.5 to about 10.5.

The ultrafiltration membrane will be operated with a pressure differential across the membrane which assists migration of the flavoring compounds, water and other materials which are capable of passing through the pores of the membrane, while not exceeding the physical strength of the membrane. Typical average pressure for such membranes are about 50 psi (345 kPa). The trans-membrane pressure (in versus out) will be about 15 psi (103 kPa). Of course, these pressures could be varied based on the membrane's specifications and other operational concerns. The flow rate of the feed stream will provide sufficient residence time for significant permeate removal, but also will be high enough to provide turbulence so that the access of the feed stream to the membrane pores will not be hindered by solid deposits on the membrane walls. One skilled in the art will understand that suitable operating parameters will be determined by experience with the materials being separated.

In a preferred embodiment, the present invention provides a method for preparing deflavored soy protein material, said method comprising: (a) preparing an aqueous composition of a soy material containing soluble soy proteins, flavoring compounds, and insoluble materials; (b) solubilizing the soy proteins by adjusting the aqueous composition of (a) to a pH in the range of about 9 to about 12 and releasing the flavoring compounds; (c) removing the insoluble materials from the pH-adjusted aqueous composition of (b) to obtain a treated aqueous composition; (d) passing the treated aqueous composition of (c) adjacent an ultrafiltration membrane having a molecular weight cutoff up to about 50,000 Daltons, while maintaining the pH in the range of about 9 to about 12, under suitable ultrafiltration conditions wherein the flavor compounds pass through the membrane, thereby deflavoring the soy material and retaining substantially all of the solubilized soy proteins; and (e) recovering the solubilized soy proteins retained by the ultrafiltration membrane to obtain the deflavored soy protein material. This preferred embodiment is described in more detail in copending U.S. patent application Ser. No. 10/655259, filed Sep. 4, 2003 and entitled "Method of Deflavoring Soy-derived Materials," and which is hereby incorporated by reference.

Figure 11:
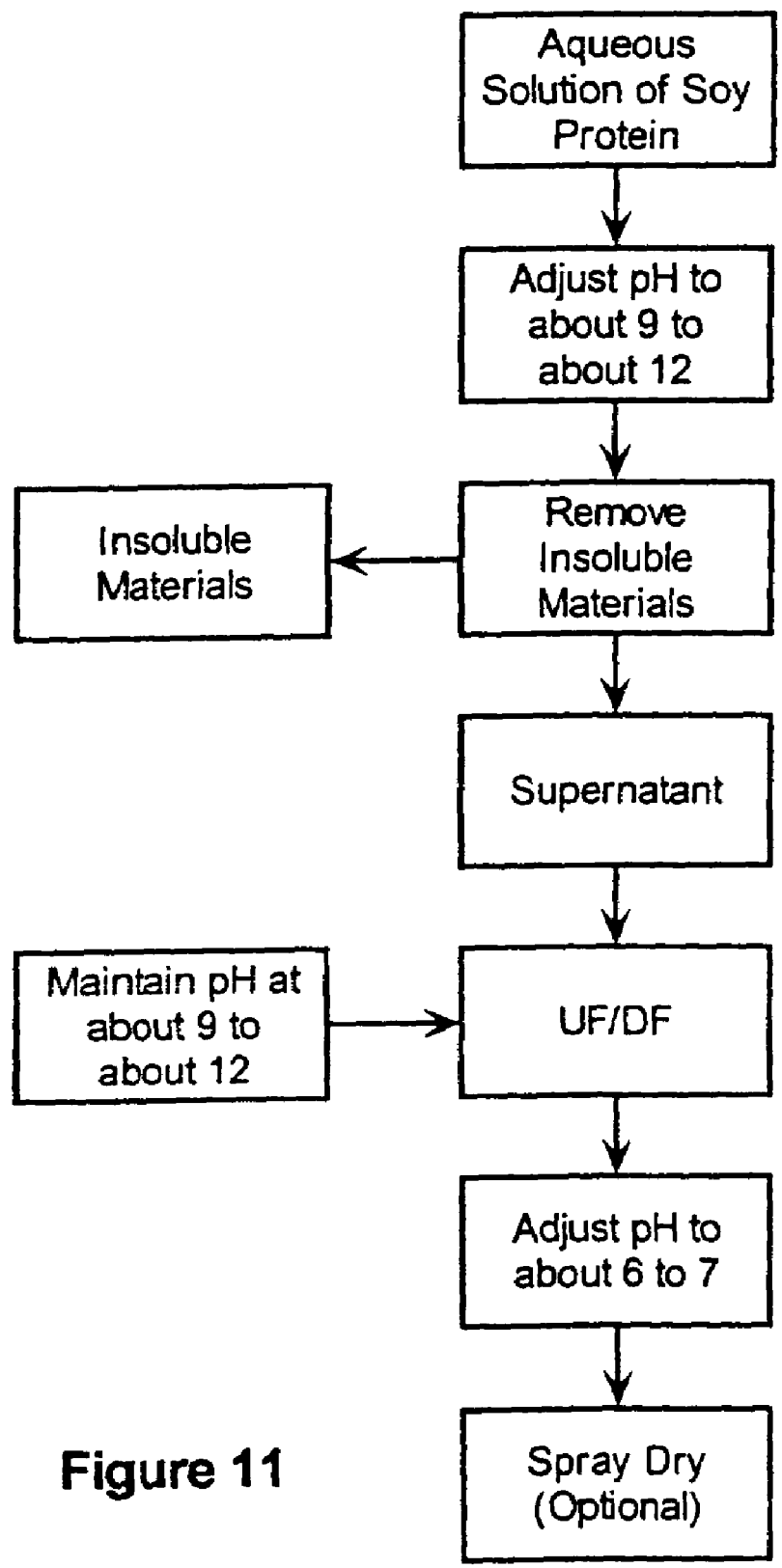
FIG. 11 is a block diagram of a preferred embodiment for preparing the deflavored soy protein material.

This preferred embodiment is illustrated in FIG. 11 wherein the pH of an aqueous solution of soy protein is adjusted to about 9 to about 12. The pH-adjusted aqueous solution is then treated to remove insoluble materials. Any conventional technique (e.g., filtration, decantation, centrifugation, and the like) can be used. Preferably, the insoluble material is removed by centrifugation. Commercial available continuous centrifugation units are ideally suited for this separation in a semi-batch or continuous type operation. In an especially preferred embodiment, the pH-adjusted aqueous is subjected to the removal technique (e.g., centrifugation) at least twice in order facilitate or more complete removal of insoluble materials. The treated supernatant is then subjected to ultrafiltration, preferably combined with diafiltration, in order to remove the flavor components normally associated with soybeans. During ultrafiltration, the pH of the soy-derived material should be maintained in the range of about 9 to about 12. After ultrafiltration, the pH is adjusted to a neutral pH using an edible acid (e.g., citric acid). The deflavored soy protein solution may be used directly or it may be converted to a solid form if desired. Any conventional technique for removing water can be used. Generally, spray or freeze drying techniques are preferred.

Deflavored Soy Products. The present invention provides soy-containing fermented dairy-type products prepared using deflavored soy protein. Fermented dairy-type products encompassed by this invention include yogurt, dairy toppings, sour cream, kefir, and similar fermented compositions which contain deflavored soy protein. The preferred fermented dairy product of this invention is yogurt. Generally, yogurt is prepared by fermenting deflavored soy milk with a culture of thermophilic organisms such as *Streptococcus salivarius* subsp. *thermophilus* (ST) and *Lactobacillus delbrueckii* subsp. *bulgaricus* (LB) that produce lactic acid and other acidic fermentation products. Additional cultures such as *Lactobacillus acidophilus* and *bifidobacteria* may also be included.

The deflavored soy protein materials prepared by the present methods are ideally suited for use in dairy and non-dairy beverages, smoothies, health drinks, cheeses, cheese analogs, fermented dairy-type products such as dairy and non-dairy yogurts, meat and meat analog products, cereals, baked products, snacks, and the like. Especially preferred food products include dairy and non-dairy yogurts prepared using a yogurt based containing deflavored soy milk and, optionally, milk which is subjected to a conventional yogurt making process. Such preferred yogurts are generally prepared by combining a deflavored soy milk prepared by the methods described herein and a suitable dairy culture (along with other desired ingredients including, for example, milk (e.g., whole milk, low-fat milk, skim milk, and the like), sweeteners, flavors (e.g., cocoa, vanilla, chocolate, and the like), nutritional additives (e.g., vitamins, minerals, and the like), fruit, colorants, buffering salts, processing aids (e.g., gums, emulsifiers, and the like), other sources of soy protein (preferably also deflavored using the methods described herein), and the like) and then fermenting the resulting mixture to obtain the desired deflavored soy-containing yogurt. Of course, such optional ingredients should not adversely effect the fermentation step; in that case, such optional ingredients should only be added after the fermentation step. Alternatively, many of these optional ingredients, even if they do not adversely effect the fermentation step, can be added to the soy-containing yogurt after the fermentation step if desired. Of course, if milk is included in the composition, it should be subjected to the fermentation process along with the deflavored soy milk. Generally, such optional ingredients are present at 0 to about 10 percent.

The yogurt base portion is prepared in any manner consistent with the preparation of a high quality yogurt, preferably with live and active cultures. Essentially, the process will entail heating deflavored soy milk, or a deflavored soy milk mixture containing other permitted ingredients, under conditions effective to inactivate any organisms present in the soy milk or soy milk mixture. The soy milk or soy milk mixture is then inoculated with a suitable culture (e.g., a symbiotic blend of *Streptococcus salvarius* (e.g., subsp. *themophilus*) and *Lactobacillus debruechii* (e.g., subsp. *bulgaricus*) and held for a time sufficient to develop the typical yogurt texture and taste. Holding at near about 20 to about 55° for about 3 to about 6 hours is typical. The final pH will typically be within the range of from about 4.2 to about 4.6. Following this step of culturing, the yogurt is cooled to stop the culturing but not to inactivate or kill the culture.

Various other materials can also be added to the deflavored soy milk prior to fermentation so long as they do not adversely affect the final quality of the yogurt. The yogurt base portion can be sweetened or mixed with bulky or other flavors as appropriate and understood by the art. For example, sugar or other sweeteners can be added prior to fermentation, so long as it is not used in such large amounts to unduly inhibit the fermentation. Bulky flavorings, such as syrups, jams, fruits in various forms (typically sweetened and of controlled pH to preserve their taste and color) and the like, can be added prior to fermentation or mixed with yogurt prior to packaging.

When a bulky flavoring or sweetener is added to the soy-containing yogurt after fermentation, the natural consistency of the soy-containing yogurt is modified and it may become necessary to add stabilizers of a type and in an amount sufficient to restore a natural yogurt-like texture. Stabilizers can also be added prior to naturally setting the yogurt for the purpose of enhancing smoothness and decreasing syneresis during long periods of storage. Typical of the stabilizers are proteinaceous materials, such as gelatin, and whey protein concentrate, natural and synthetic hydrophilic colloids, such as carboxymethyl cellulose, vegetable/fruit gums, such as locust bean gum, carob bean gum, guar gum, pectin, carrageenans and alginates, and various starches and modified starches. The stabilizers are can be added prior to or after fermentation; generally addition prior to fermentation is preferred in order to assure thorough mixing with least effect on natural texture.

The base composition normally used for preparing the soy-containing yogurts of this invention comprises deflavored soymilk prepared by the methods described herein, a sweetener, and an effective amount of a dairy culture. Generally the base composition is a water based composition containing about 1 to about 10 percent deflavored soy milk proteins (preferably about 2 to about 8 percent), about 5 to 15 percent sweetener, and about 0.5 to about 2 percent dairy culture (preferably about 0.75 to about 1.5). Stabilizers can be used if desired at a level of about 0 to about 10 percent. Dairy cultures as described above which are normally used to prepare dairy-based yogurts can be used in the present invention. As also noted above, sweeteners that can be used to prepare the beverage of this invention include both natural and artificial sweeteners. Examples of such sweeteners include natural sugars such as sucrose, fructose, glucose, maltose, high fructose corn syrup, and lactose and artificial sweetening agents such as saccharin, aspartame, acesulfame potassium, and sucralose. Of course, others sweeteners normally used in food processing can be used if desired. Fruits and/or fruit flavors can be added to the soy-containing yogurts of the present invention if desired; generally, such fruits and/or fruits are added after fermentation.

The soy-containing yogurts of this invention can be prepared using deflavored soy milk as prepared by the present method as well as mixture of the deflavored soy milk and milk (e.g., whole milk, reduced fat milk, skim milk, and the like); generally less than about 50 percent of the total protein is derived from milk. Generally yogurts prepared from compositions deflavored soy milk and essentially no added milk protein or only limited added milk protein (i.e., less than about 5 percent, milk protein relative to total protein) are preferred.

In a preferred procedure for preparing the soy-containing yogurts of this invention, the deflavored soy and the dry ingredients are mixed together, along with any required water, in blender and then preheated at about 105 to about 140° F. The heated mixture is then homogenized (preferably in a two stage homogenizer at pressures of about 500 to about 5000 psi) and then pasteurized (generally at about 160 to about 200° F. for about 2 seconds to about 30 minutes). After pasteurization, the homogenized mixture is heated, preferably using steam injection, to about 200 to about 250° F. and held at that temperature for about 20 to about 60 seconds in order to hydrate any added stabilizer (especially any added starch). The resulting mixture is then vacuum flashed (generally at reduced pressures of about 25 to about 31 inches Hg) in order to remove any trapped air and/or foam which may have formed during processing; this step helps to insure the final product has the creamy texture normally associated with yogurt. The mixture is then cooled to about 90 to about 110° F. before adding the starter culture. Culturing is generally carried out at about 100 to about 115° F. for a time sufficient to obtain a pH of about 3.8 to about 5.5, and preferably about 4 to 5; generally a time of about 2 to about 6 hours is sufficient. After culturing is complete, the mixture is cooled to about 35 to about 45° F. and then packaged using conventional techniques. If desired, fruit (preferably in the form of a fruit puree) can be added before packaging.

Additionally, the soy-containing yogurts of this invention can also be prepared, if desired, using nisin-containing whey using the procedures and techniques described in U.S. Pat. No. 6,136,351 (Oct. 24, 2000), in combination with the present teachings. Moreover, the chocolate flavored soy-containing yogurts of this invention can also be prepared, if desired, using the procedures and techniques described in U.S. Pat. No. 6,068,865 (May 30, 2000), in combination with the present teachings. Both of these just-mentioned patents are owned by the same assignee of the present invention and are hereby incorporated by reference. Generally, the procedures described herein for incorporating defla-vored soy proteins can be used in, with appropriate modifications, conventional yogurt making procedures.

Unless noted otherwise, all percentages are by weight. All references cited herein are incorporated by reference.

EXAMPLE 1

Soy protein isolate (Protein Technology International (PTI); St. Louis, Mo.) was hydrated in tap water to provide a concentration of 10 percent. The aqueous composition was mixed with a magnetic stirrer until all of the soy protein isolate was completely dispersed. The pH of the mixture was adjusted to 11.0 using sodium hydroxide. Then, the pH-adjusted composition was placed in a dialysis tube (Spectrum, Inc.) having a 3500 molecular weight pore size and tap water was passed over the outside of the tube continuously for about 4 hours; the pH remained greater than about 9 during dialysis. The composition remaining in the dialysis tube was poured into a glass beaker, neutralized, and evaluated for aroma and taste. A comparison was made with the dialyzed composition and a sample treated in a similar manner, but which had a pH of 6.7 and a second sample which had been neither dialyzed nor pH-adjusted. Blind evaluation by several individuals showed that only the pH-adjusted and dialyzed sample had significantly improved taste and aroma.

EXAMPLE 2

A similar test was carried out using soy milk (Devansoy Farms, Carrol, Iowa) made into a 10 percent aqueous composition and then pH-adjusted and dialyzed overnight as in Example 1. After the treatment, the pH of the sample was 8.8 and the aroma and taste were significantly improved.

EXAMPLE 3

Example 2 was repeated with soy milk freshly prepared by soaking and blanching the beans and then grinding and separating the soy milk from the meal. After pH adjustment and dialysis as previously described, it was found that the taste and aroma of the soy milk was significantly improved.

EXAMPLE 4

Example 3 was repeated using a dialysis tube having a pore size of 6000 molecular weight and similar results were obtained.

EXAMPLE 5

Example 2 was repeated with dry soy flour (Cargill, Inc.). The soy flour was hydrated to a 10 percent composition and then pH-adjusted as previously described. After dialyzing overnight the pH of the remaining composition in the dialysis tube had a pH of 8.7 and had significantly improved aroma and taste.

EXAMPLE 6

In a large mixing tank 33 pounds (15 kg) of Sun Rich soy milk containing 15 percent solids was diluted with 66 pounds (30 kg) of water to produce a slurry of 100 pounds (45 kg) containing 5 percent soy solids. A 1 N NaOH solution was added slowly to solubilize the soy proteins until a pH of 11 was reached.

A diafiltration of the alkalized soy solution was carried out by pumping the solution from the mixing tank through two parallel hollow fiber membranes (A/G Technology Corporation) having a molecular weight cutoff of 10,000 Daltons and a surface area of 3.3 m$^2$. The trans-membrane pressure across the membranes was 20–50 psi (138–345 kPa). The material passed through the membrane (permeate) was collected. The remaining material (retentate) was continuously recycled to the mixing tank. When 50 pounds (22.7 kg) of permeate had been collected, the mixing tank contained 50 pounds (22.7 kg) of soy solution. An additional 50 pounds (22.7 kg) of water was added to the mixing tank. The pH was maintained at about 9 to about 12 during ultrafiltration/diafiltration. This washing with addition of water to the mixing tank was repeated five times, after which the solution in the mixing tank was concentrated to about 10 percent solids as water was removed in the permeate and then the retained soy solution was neutralized with 2 percent citric acid to a pH of 7.0.

The neutralized solution was evaluated by a trained sensory panel and compared with a control sample of Sun Rich soy milk which had been diluted to 10 percent with water, but not otherwise treated. The soy solutions were presented in a blind and randomized order. The results are shown in the graphs of FIGS. 1 and 2.

Figure 2:
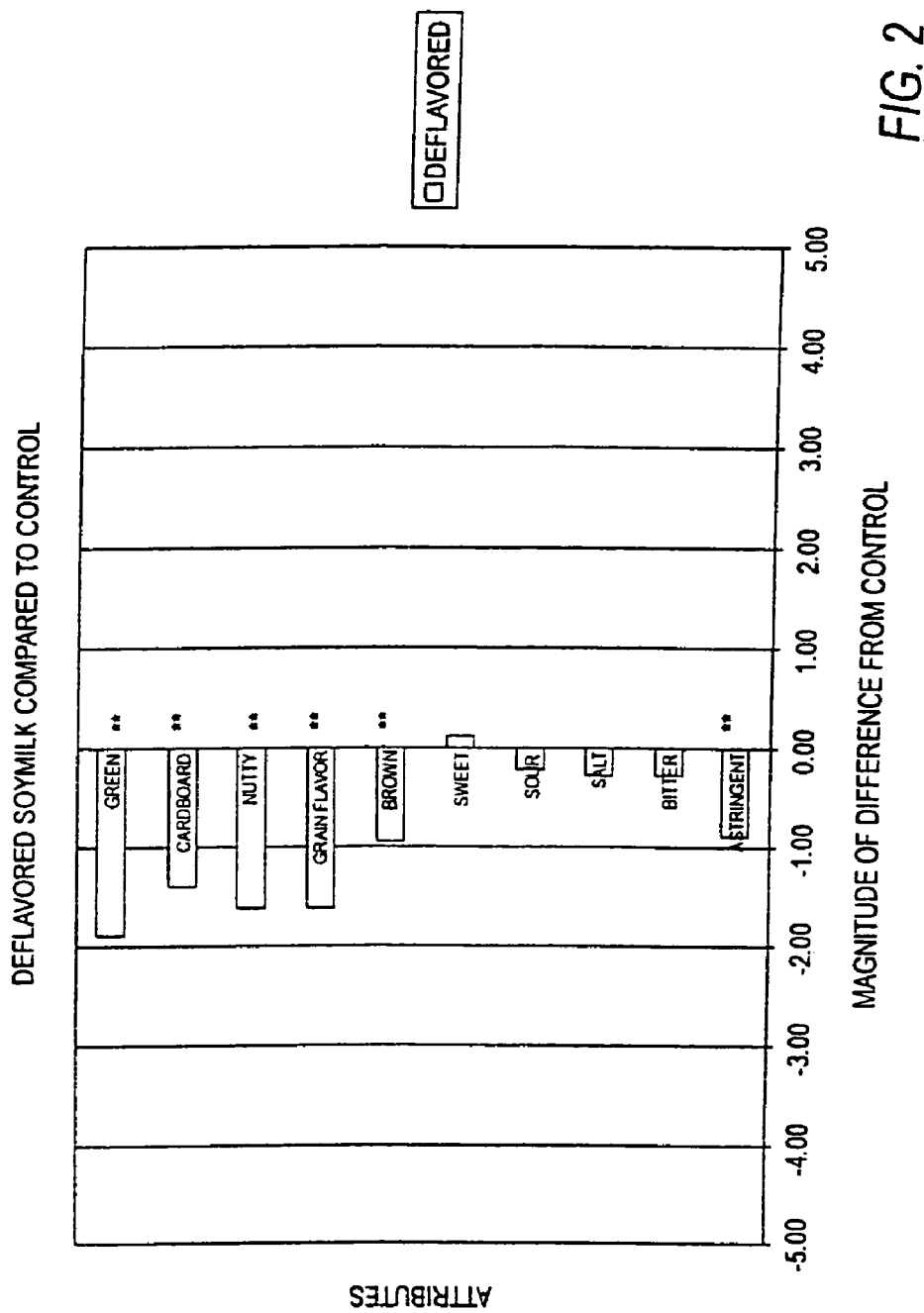
FIG. 2 is a graph of the intensity of deflavored soy milk compared to a control sample.

FIG. 1 shows the mean intensity score for 10 attributes. The panel judged certain attributes to be more significant than others. When compared to the soy solution which had been treated as described above, the outstanding attributes had all been reduced with a 95 percent confidence level. Those attributes which had less prominent in the control (i.e., Brown, Sweet, Sour, Salt and Bitter) were reduced, except for Sweet which increased in value, but the panel mean values did not reach a 95 percent confidence level.

It is clear from the results that the soy solution had been rendered more neutral in flavor by removal of flavor components.

EXAMPLE 7

Ten pounds (4.55 kg) of a soy protein concentrate (Central Soya) was mixed with 190 pounds (86.4 kg) of water in a tank with high agitation for 15–30 minutes to hydrate the soy protein. Then 1 N NaOH was added to solubilize the soy protein to a pH of 11. In a similar manner to that described in Example 6 the soy slurry was pumped through a spiral membrane (Gea Niro Inc.) having a molecular weight cutoff of 10,000 Daltons. The trans-membrane pressure across the membrane was maintained below 50 psi (344.7 kPa). The pressure drop through the membrane was maintained below 15 psi (103.4 kPa) and the pH was maintained at about 9 to about 12. As in Example 6, five additions of water were made when the permeate withdrawn from the membrane reached one-half of the original volume in the mixing tank. After five water additions the pH of the washed soy solution was adjusted to 7.5 by adding 0.5 N HCl and then freeze dried for sensory evaluation.

Figure 3:
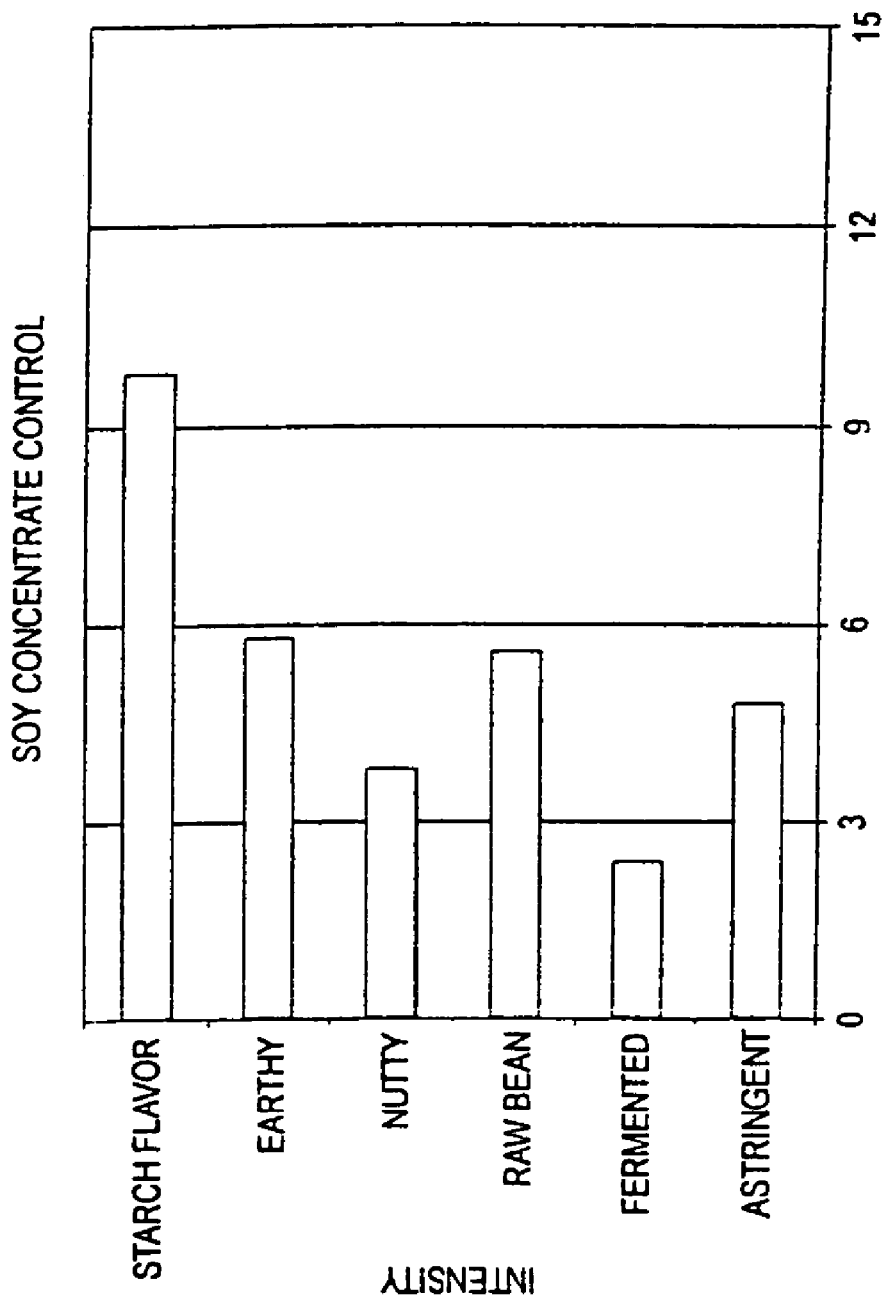
FIG. 3 is a graph of the intensity of another group of soy flavor attributes.
Figure 4:
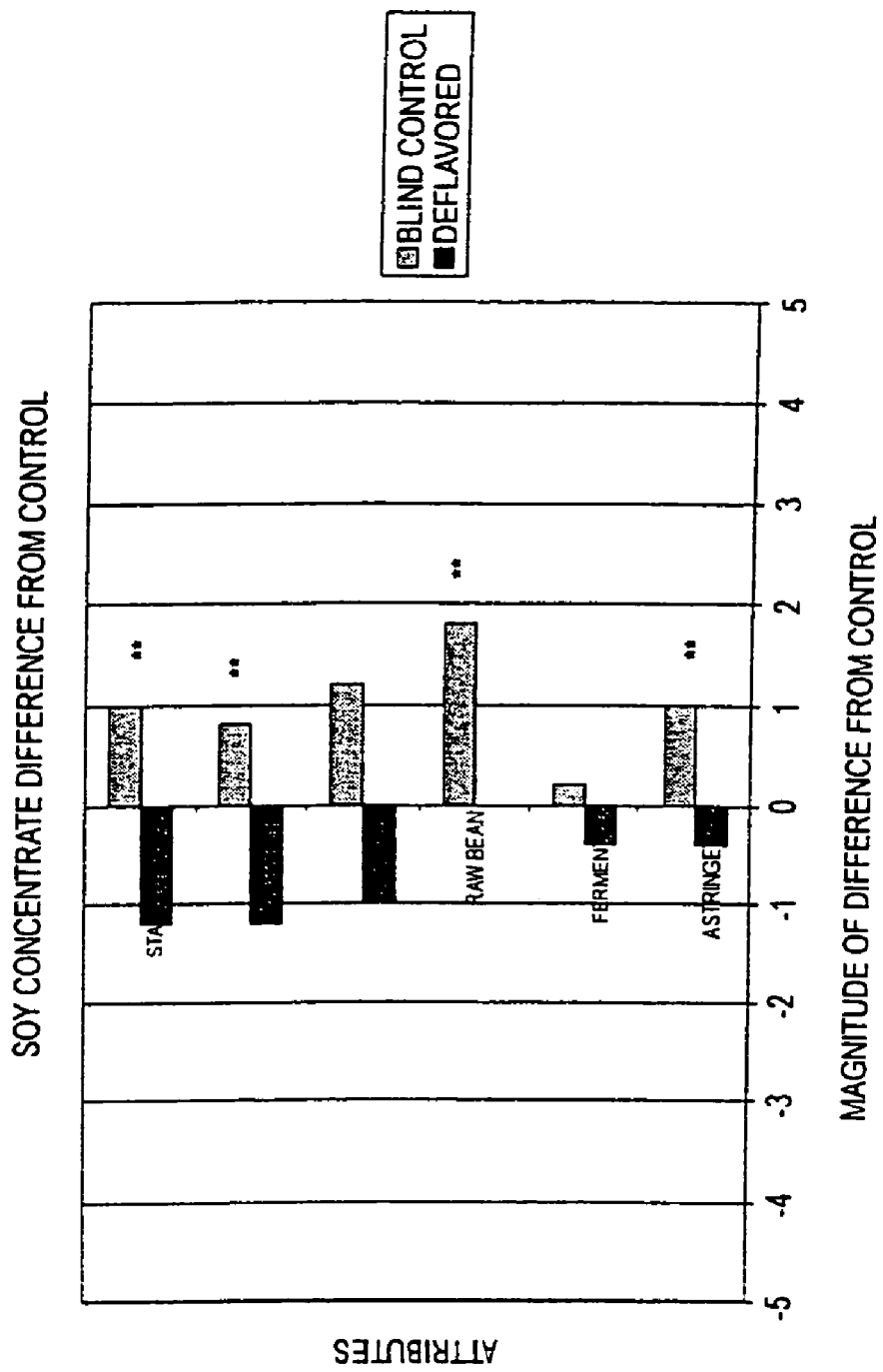
FIG. 4 is a graph of the intensity of deflavored soy concentrate and a control sample compared to the sample of FIG. 3.
Figure 5:
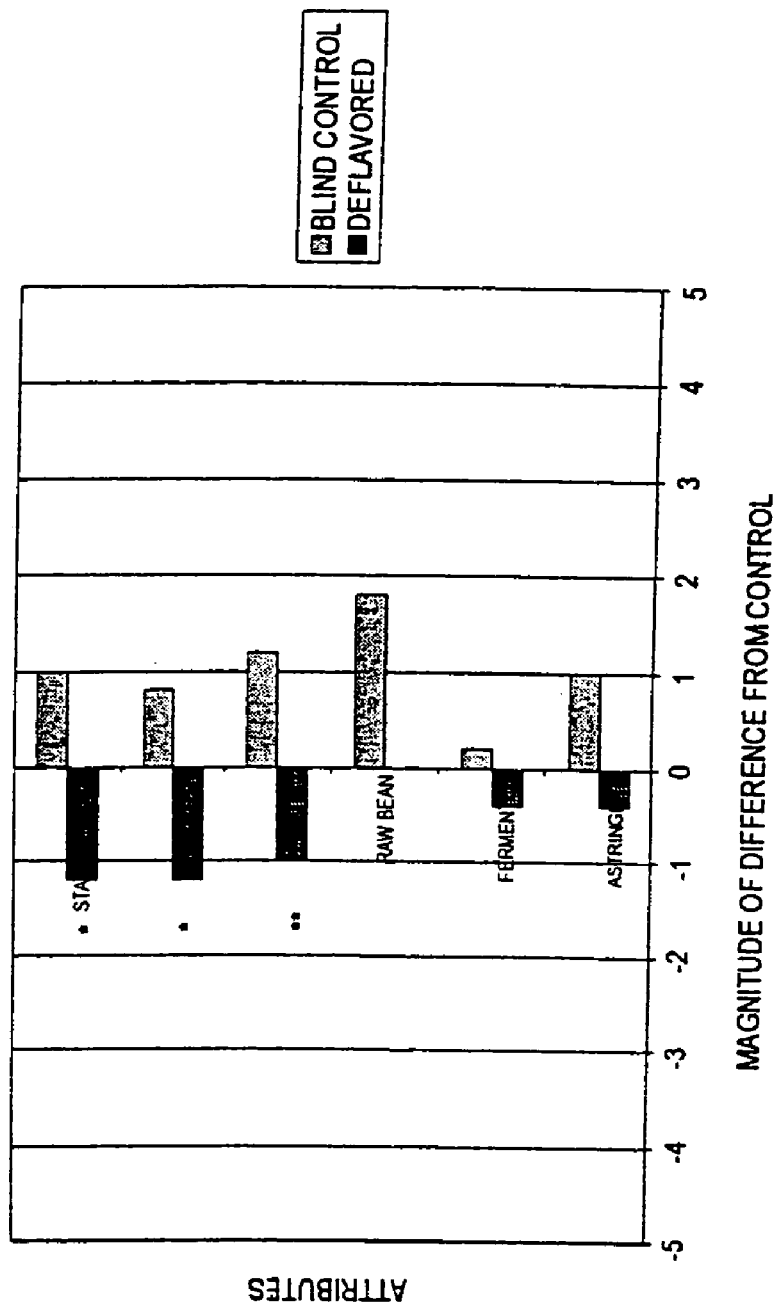
FIG. 5 is a graph of the intensity of deflavored soy concentrate and a control sample.

The deflavored soy protein concentrate was evaluated for six attributes by a trained sensory panel. The mean values for each attribute for the control sample (untreated) are given in FIG. 3. In this example a difference was found between the deflavored soy concentrate and the control, but none were at the 95 percent confidence level, although all the values were lower. This is shown in FIG. 4. Also included are the results of a blind control used, which was rated after the deflavored sample. In this case, the blind control was found to have stronger flavor attributes than the original control of FIG. 3. It is believed that this occurred because the blind control in this example was tested after the deflavored sample and appeared to the panel to have a relatively stronger flavor in the second evaluation of the control. However, when compared with the blind control sample, the deflavored sample showed significant differences for three of the flavor attributes at the 90 to 95 percent confidence level, as shown in FIG. 5.

EXAMPLE 8

The membrane used to deflavor soy proteins should have a molecular weight cutoff of 10,000 Daltons, shown to be effective in Examples 6 and 7. A higher molecular weight cutoff membrane can be used if desired, but at a molecular weight cutoff of 50,000 Daltons some valuable proteins have been lost in the permeate, as is shown in this example.

Five pounds (2.27 kg) is a dry soy isolate (Supro-670 PTI) was mixed with 95 pounds (43.2 kg) of water as in Example 7 to provide a slurry containing 5 percent soy solids. 1 N NaOH was added to raise the pH to 11 and solubilize the soy proteins. Diafiltration using five additions of water was carried out in a manner similar to that described in Examples 6 and 7 and using the hollow fiber membranes of Example 6. The pH was maintained at about 9 to about 12 during ultrafiltration/diafiltration. Samples of the permeate were taken at five minute intervals, neutralized and frozen for protein analysis.

The permeate samples were analyzed for total protein content by electrophoresis, with the results shown in the following table:

TABLE A

| | Molecular Weight Cutoff | |
|---|---|---|
| Time (minutes) | 10,000 Daltons Protein (%) | 50,000 Daltons Protein (%) |
| 0 | 0 | 0.4 |
| 5 | 0.6 | 1 |
| 10 | 0.8 | 0.6 |
| 15 | 0.4 | 0.6 |
| 20 | 0.4 | 0.6 |
| 25 | 0 | 0.4 |
| 30 | 0 | 0.4 |
| 35 | 0.5 | 0.4 |
| 40 | 0 | 0.3 |
| 45 | 0 | N/A |

It can be seen that the membrane having a 10,000 Dalton cutoff retains more protein than the membrane having a 50,000 Dalton cutoff. The value at 35 minutes for the 10,000 Dalton membrane is believed to be erroneous.

EXAMPLE 9

Samples of soy materials deflavored using the methods of Examples 6–8 were analyzed by protein gel electrophoresis. The results indicate that the molecular weight distribution of the retained soy materials was substantially the same as that of the original soy material. The results are shown in the following table:

TABLE B

| Molecular Weight (KD) | Soy Material | | | | | | | |
|---|---|---|---|---|---|---|---|---|
| | Soy Flavor | | Soy Isolate | | Soy Isolate | | Soy Milk | |
| | Control (%) | Deflavored (%) | Control (%) | Deflavored (%) | Control (%) | Deflavored (%) | Control (%) | Deflavored (%) |
| >26 | 74 | 73 | 21.7 | 19.7 | 22 | 20 | 69 | 71 |
| 14–27 | 18 | 19 | 30.8 | 32.2 | 31 | 32 | 20 | 21 |
| 3.5–14 | 7 | 8 | 47.4 | 48 | 45 | 48 | 10 | 9 |
| <3.5 | 0 | 0 | 0 | 0 | 0 | 0 | 0 | 0 |

EXAMPLE 10

Analysis were carried out for the chemical constituents associated with the flavor attributes determined by the sensory panels described in previous examples. Two samples of soy protein isolates were tested. One sample had been deflavored by the method described in Example 7; the second sample had not been deflavored.

Figure 6:
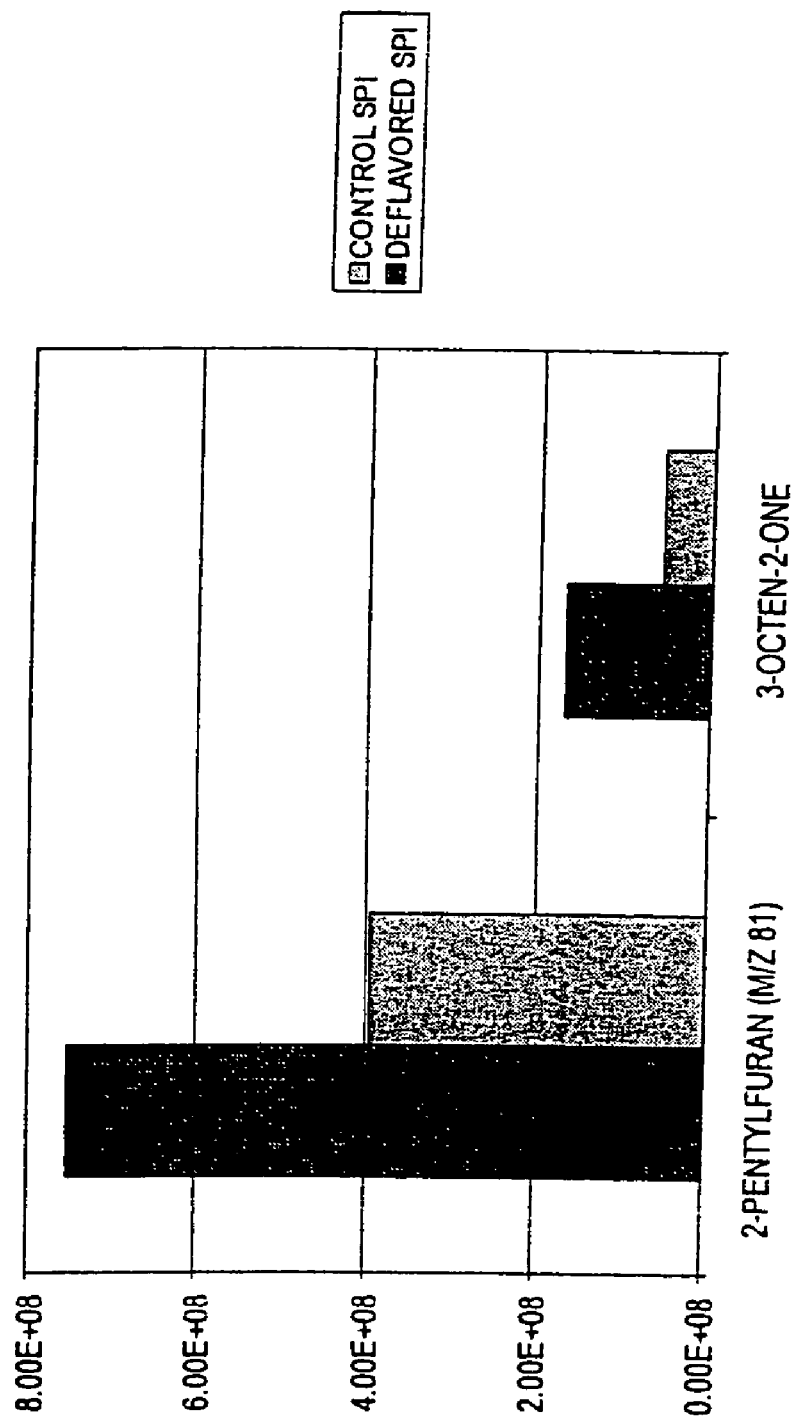
FIG. 6 is a graph showing the change in concentration of flavor compounds between a deflavored soy sample and a control sample.
Figure 7:
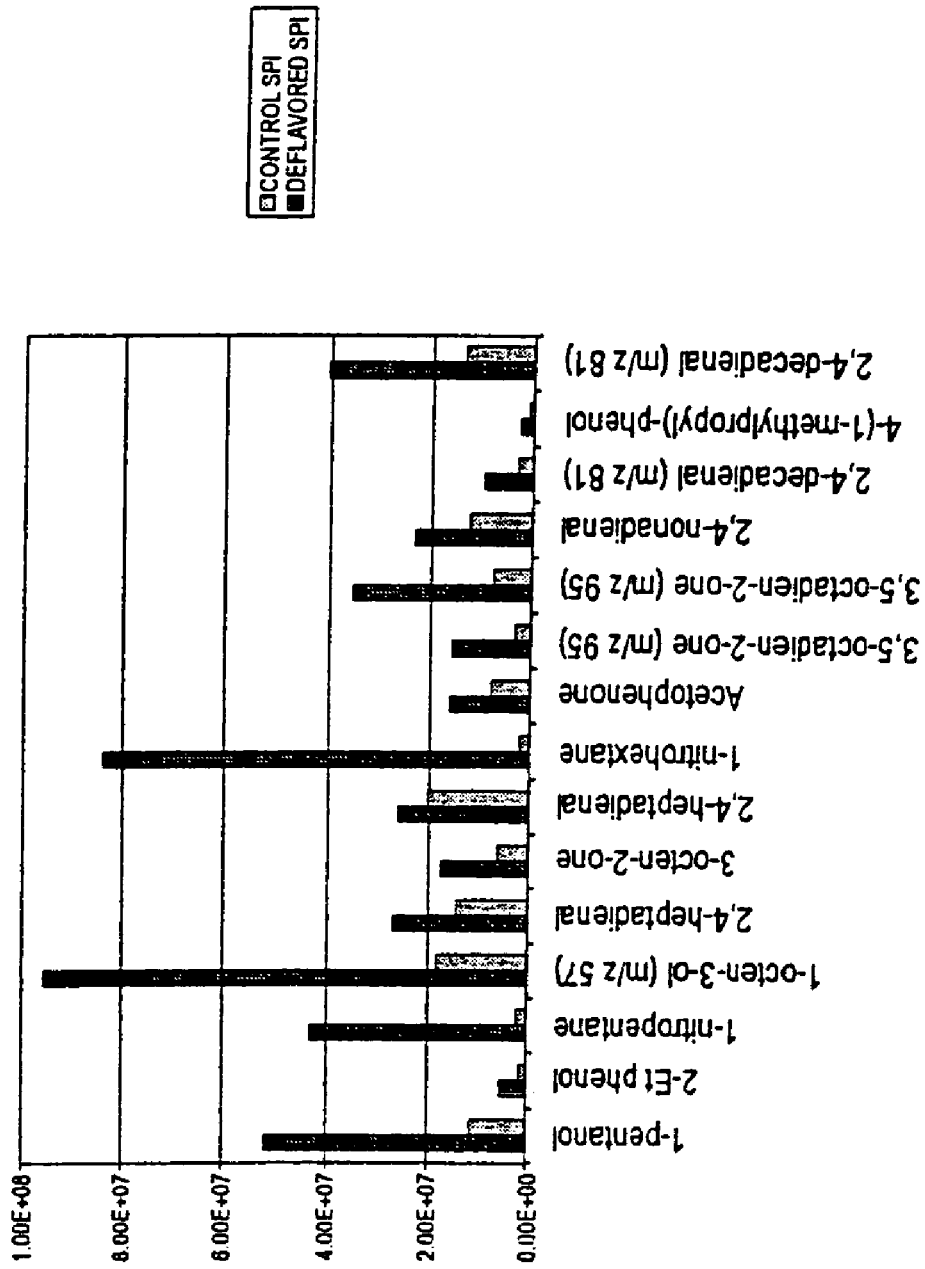
FIG. 7 is a graph showing the change in concentration of flavor compounds between a deflavored soy sample and a control sample.

In a first test, one gram of a control sample was diluted with 15 g of water, 2 µl of 300 ppm of 4-heptanone was added as an internal standard, and the mixture was purged with 100 ml/min of helium at 60° C. for 30 min. A deflavored sample was prepared similarly as the control sample, except that the pH was raised to 10 by adding a NaOH solution in order to solubilize the proteins. The volatile compounds were analyzed by GC/MS (HP GC5890/MSD5972). The results for various compounds are shown in FIGS. 6 and 7. The deflavored soy sample contained smaller amounts of the flavoring compounds.

In a second test, three gram samples were diluted with 30 g of water and 2 µl of 300 ppm 4-heptanone was added as an internal standard. The resulting mixtures were purged with 100 ml/min of helium at 60° C. for 20 min to remove the volatile compounds. The volatiles were analyzed by gas chromatography and the odor of the compounds judged by human criteria. The odors associated with specific chemical compounds are reported in the following table:

TABLE C

Odor Characteristics of Decreased Compounds After Deflavoring Process.

| Compound | Odor in SPI Control | Odor in Deflavored SPI |
|---|---|---|
| 1-pentanol | faint, green | weakly fatty |
| 2-ethylphenol | spicy, herbaceous | ND |
| 1-nitropentane | ND | ND |
| 1-octen-3-ol | mushroom, earthy, very strong | mushroom, earthy, strong |
| cis-2,4-heptadienal | ND | ND |
| cis-3-octen-2-one | ND | ND |
| trans-2,4-heptadienal | ND | weak green |
| acetophenone | burnt, floral, caramel | burnt, caramel |
| cis, trans-3,5-octadien-2-one | ND | ND |
| trans, trans-3,5-octadien-2-one | green, floral, fatty | fatty, green |
| 2,4-nonadienal | fatty, oily, deep-fried | fatty, oily, deep-fried |
| cis-2,4-decadienal | fatty, oily, musty | green onion, painty |
| 4-(1-methylpropyl)-phenol | bubblegum, fruity | ND |
| trans-2,4-decadienal | fatty, oily, waxy | fatty, oily, green |
| 2-pentylfuran | green, floral, etherous | green, floral, etherous |
| trans-3-octen-2-one | floral, green, earthy | floral |

EXAMPLE 11

Commercial soy milk (155 lbs) from Sun Rich Company was diluted with water (150 lbs) in a batching tank equipped with an overhead mixer. NaOH (1 N) was then added to raise the pH to 10; once equilibrated, the slurry was pre-filtered with an in-line screen filter (100–120 micron holes) to remove any large insoluble particles. The alkalized slurry was diafiltered through a spiral membrane similar to the one used in Example 7. The retentate was recirculated with water added as permeate was removed. Diafiltration was continued until the amount of permeate removed was equal to about 5× the initial batch size. The pH was maintained at about 10 during ultrafiltration/diafiltration. After completion of the ultrafiltration/diafiltration, the resulting rentenate was neutralized with 1 percent citric acid to a pH of 6.5. The collected deflavored soy milk was then pasteurized (about 185° F. for about 5 minutes) and then stored under refrigeration conditions until used. The deflavored soy milk was found to be bland, much less beany and/or grassy, with an overall cleaner flavor as compared to a control sample (i.e., non-deflavored soy milk).

EXAMPLE 12

Deflavored soy milk as prepared in Example 11 was used to prepared various soy-containing yogurts. In some cases, deflavored soy isolate (generally prepared using the method described in Example 11) was also used. The following base formulations were used:

| Ingredient | Control Sample (%) | Inventive Samples (%) | | | | | |
|---|---|---|---|---|---|---|---|
| | | 1 | 2 | 3 | 4 | 5 | 6 |
| Whole Milk | 26.3 | 11.1 | 26.3 | 26.3 | 13.3 | 0 | 0 |
| Skim Milk | 40.4 | 0 | 0 | 0 | 0 | 0 | 0 |
| Deflavored Soy Milk | 0 | 75.0 | 57.8 | 57.8 | 70.9 | 82.1 | 82.1 |
| Water | 19.4 | 0 | 0 | 0 | 0 | 0 | 0 |
| Whey Protein Concentrate | 3.0 | 0 | 0 | 0 | 0 | 3.0 | 0 |
| Gelatin | 0 | 0 | 0 | 0 | 0.2 | 0.2 | 0.2 |
| Starch | 3.0 | 3.0 | 3.0 | 3.0 | 3.0 | 3.0 | 3.0 |
| Deflavored Soy Isolate | 0 | 2.0 | 5.0 | 5.0 | 0 | 0 | 0 |
| Lactose | 0 | 0 | 0 | 0 | 0 | 0 | 0.2 |
| Sugar | 7.8 | 7.8 | 7.8 | 7.8 | 7.8 | 7.8 | 7.8 |

The above composition (batch size of about 70 lbs) was prepared by mixing all ingredients except the dairy culture using a high speed mixer. The mixture was heated to about 125° F. and then homogenized at about 1000 psi until no visible lumps were observed. The homogenized mixture was then pasteurized (185° F for 19 seconds, followed steam injection to raise the temperature to about 215° F for 38 seconds). The pasteurized mixture was vacuum flashed (30 inches Hg) in order to remove air and/or foam which may have formed during processing and then cooled to about 100° F.

The dairy culture was then added and the inoculated mixture was fermented in a hot box (about 100 to about 115° F.) for about 3.5 hours. Once the desired target pH (i.e., about 4.6) was reached, the fermented composition was cooled to about 40° F.

All inventive samples (including samples prepared with soy and dairy protein as well as samples prepared only with soy protein) were found to be comparable in taste and other organoleptic properties to the control samples (as well as plain commercially available yogurts).

EXAMPLE 13

Deflavored soy milk as prepared in Example 11 was used to prepare an especially preferred soy-containing yogurt which contains essentially no milk protein. The formulation contained 89.1 percent deflavored soy milk; 0.15 percent pectin (Type LM-104 AS/YA; CP Kelco, Wilmington, Del.); 3 percent starch (Pur-Flo; National Starch, Bridgewater, N.J.); 7.8 percent sugar (Florida Crystals, West Palm Beach, Fla.); and 1 percent bulk dairy culture (ABY-2C; Rhodia Foods, Cranbury, N.J.).

The above composition (batch size of about 70 lbs) was prepared by mixing all ingredients except the dairy culture using a high speed mixer. The mixture was heated to about 125° F. and then homogenized at about 1000 psi until no visible lumps were observed. The homogenized mixture was then pasteurized (185° F. for 19 seconds, followed steam injection to raise the temperature to about 215° F. for 38 seconds). The pasteurized mixture was vacuum flashed (30 inches Hg) and then cooled to about 100° F.

The dairy culture was then added and the inoculated mixture was fermented in a hot box (about 110 to about 115° F.) for about 3.5 hours. Once the desired target pH (i.e., about 4.6) was reached, the fermented composition was cooled to about 40° F. The resulting soy-containing yogurt contained about 2.5 percent fat, about 81.5 percent moisture, and about 4.1 percent soy protein. A shelf life of at least about 50 days under refrigeration conditions was observed.

A sample of the soy-containing yogurt was blended with about 20 percent of an organic fruit puree and evacuated by a trained taste panel. The resulting fruit-containing soy yogurt had excellent taste, texture, and mouthfeel without the off-flavors normally associated with soy beans and was considered similar to commercially available dairy based yogurts.

The invention claimed is:

1. A method of preparing a soy-containing fermented product, said method comprising:
  (1) preparing a mixture of deflavored soy milk material and an effective amount of a starter culture; and
  (2) fermenting the mixture to form the soy-containing fermented product;
  wherein the deflavored soy milk material is prepared by a method comprising:
  (a) obtaining a soy milk composition containing soluble soy proteins, flavoring compounds, and insoluble materials;
  (b) solubilizing the soy proteins by adjusting the soy milk composition of (a) to a pH in the range of about 9 to about 12 and releasing the flavoring compounds;
  (c) passing the pH-adjusted soy milk composition of (b) adjacent an ultrafiltration membrane having a molecular weight cutoff up to about 50,000 Daltons, while maintaining the pH in the range of about 9 to about 12, under suitable ultrafiltration conditions wherein the flavor compounds pass through the membrane, thereby deflavoring the soy milk composition and retaining substantially all of the solubilized soy proteins; and
  (d) recovering the solubilized soy proteins retained by the ultrafiltration membrane, wherein the recovered solubilized soy proteins is the deflavored soy milk material.

2. The method of claim 1, wherein the soy-containing fermented product is a soy-containing yogurt.

3. The method of claim 1, wherein the mixture of deflavored soy milk material and the starter culture contains at least one additive selected from the group consisting of flavors, nutritional additives, fruits, colorants, and processing aids.

4. The method of claim 2, wherein the mixture of deflavored soy milk material and the starter culture contains at least one additive selected from the group consisting of flavors, nutritional additives, fruits, colorants, and processing aids.

5. The method of claim 1, wherein the pH of the deflavored soy milk is adjusted to about 3 to about 7 prior to fermentation.

6. The method of claim 2, wherein the pH of the deflavored soy milk is adjusted to about 3 to about 7 prior to fermentation.

7. The method of claim 1, wherein the ultrafiltration membrane has a cutoff in the range of about 1,000 to about 50,000 Daltons.

8. The method of claim 2, wherein the ultrafiltration membrane has a cutoff in the range of about 1,000 to about 50,000 Daltons.

9. The method of claim 7, wherein the ultrafiltration is carried out at a temperature in the range of about 10 to about 60° C. and a suitable pressure and wherein the ultrafiltration membrane is a polymer, ceramic, or inorganic membrane.

10. The method of claim 8, wherein the ultrafiltration is carried out at a temperature in the range of about 10 to about 60° C. and a suitable pressure and wherein the ultrafiltration membrane is a polymer, ceramic, or inorganic membrane.

* * * * *

UNITED STATES PATENT AND TRADEMARK OFFICE
CERTIFICATE OF CORRECTION

PATENT NO.        : 7,108,881 B2                                          Page 1 of 1
APPLICATION NO. : 10/696284
DATED             : September 19, 2006
INVENTOR(S)       : Akashe et al.

It is certified that error appears in the above-identified patent and that said Letters Patent is hereby corrected as shown below:

In column 18, line 3, claim 1, delete "deflevored" and insert -- deflavored --.

Signed and Sealed this

Twenty-first Day of August, 2007

JON W. DUDAS
*Director of the United States Patent and Trademark Office*